No. 761,123.

Patented May 31, 1904.

UNITED STATES PATENT OFFICE.

HUGO WITTER, OF ELBERFELD, GERMANY, ASSIGNOR TO FARBENFABRIKEN OF ELBERFELD CO., OF NEW YORK, N. Y., A CORPORATION OF NEW YORK.

RED AZO DYE.

SPECIFICATION forming part of Letters Patent No. 761,123, dated May 31, 1904.

Application filed March 5, 1904. Serial No. 196,697. (No specimens.)

*To all whom it may concern:*

Be it known that I, HUGO WITTER, doctor of philosophy, chemist, (assignor to the FARBENFABRIKEN OF ELBERFELD COMPANY, of New York,) residing at Elberfeld, Germany, have invented a new and useful Improvement in Azo Dyes; and I hereby declare the following to be a clear and exact description of my invention.

My invention relates to the production of new azo dyestuffs which can be obtained by the combination of diazotized alpha-amidoanthraquinones with naphthol sulfonic acids. The new coloring-matters thus produced are valuable in dyeing and in the art of lake-making, (pigment colors.) For the preparation of the lakes the alkaline salts of the dyestuffs are, for instance, dissolved in water and then mixed with a solution of salts of calcium, barium, strontium, magnesium, aluminium, or the like, a corresponding oxid, hydroxid, &c., or mixtures of these bodies. Of course other methods can also be used.

The new coloring-matters are in the shape of the alkaline salts from reddish-brown to brown powders which are soluble in water with from a yellow to bluish-red color and dye wool from acid-baths from yellowish-red to red to brownish-red shades. The lakes thereof, containing calcium, barium, strontium, magnesium, aluminium, or the like, are of a bluish-red to red to brownish-red color fast to light.

In carrying out the new process practically I can proceed as follows, the parts being by weight: 22.3 parts of alpha-monoamidoanthraquinone suspended in three hundred parts of water are diazotized in the usual way by the addition of seven parts of sodium nitrite and forty parts of hydrochloric acid of 20° Baumé. The resulting diazo compound is then slowly added to a solution of thirty-two parts of 2-naphthol-6.8-disulfonic acid containing an excess of sodium carbonate. After being stirred for twelve hours it is heated to about 70° centigrade, and the dyestuff is then precipitated by the addition of common salt, filtered off, and dried. The new coloring-matter thus obtained is when dry and pulverized a reddish-brown powder which is readily soluble in water with a yellowish-red color, from which solution the free dyestuff sulfonic acid is precipitated by the addition of hydrochloric acid and is dissolved by concentrated sulfuric acid of 66° Baumé with a yellowish-red color. It dyes wool from acid-baths yellowish-red shades. The lakes produced with the aid of this dyestuff, containing simultaneously barium and aluminium, have red shades which are fast to light.

The above-mentioned process proceeds in an analogous manner on replacing the alpha-monoamidoanthraquinone by other alpha-amidoanthraquinones, such as the 1.5- or the 1.8-diamidoanthraquinones. Instead of the 2-naphthol-6.8-disulfonic acid other naphthol sulfonic acids may be used, such as the 1-naphthol-4-sulfonic acid, the 1-naphthol-3.6- or 3.8-disulfonic acids, the 2-naphthol 3.6- or 5-7-disulfonic acids, the 2-naphthol-3.6.8-trisulfonic acid, or the 2-naphthol-8-sulfonic acid, &c. On combining, for instance, the alpha-amidoanthraquinone with the 1-naphthol-4-sulfonic acid a bluish-red dye is obtained. By the combination of the diazo compounds of 1.5 or 1.8-diamidoanthraquinone with two molecules of 2-naphthol 3.6.8-trisulfonic acid red coloring-matters result, &c.

Having now described my invention and in what manner the same is to be performed, what I claim as new, and desire to secure by Letters Patent, is—

1. The herein-described new azo dyestuffs which can be obtained from diazotized alpha-amidoanthraquinones and naphthol sulfonic acids, which dyestuffs are in the shape of their alkaline salts from reddish-brown to brown powders, soluble in water with from a yellow to bluish-red color; dyeing wool from yellowish-red to red to brownish-red shades and forming from bluish-red to red to brownish-red lakes with alkaline earths, substantially as hereinbefore described.

2. The herein-described new azo dyestuff which can be obtained from diazotized alpha-amidoanthraquinone and 2-naphthol-6.8-disulfonic acid, which is in the shape of its sodium salt a reddish-brown powder, readily soluble in water with a yellowish-red color, the free dyestuff sulfonic acid being precipitated therefrom by the addition of hydrochloric acid; being dissolved by concentrated sulfuric acid of 66° Baumé with a yellowish-red color, dyeing wool from acid-baths yellowish-red shades and forming red lakes containing simultaneously aluminium and barium, substantially as hereinbefore described.

In testimony whereof I have signed my name in the presence of two subscribing witnesses.

HUGO WITTER.

Witnesses:
OTTO KÖNIG,
J. A. RITTERSHAUS.